United States Patent [19]
Kiczek et al.

[11] Patent Number: 5,509,278
[45] Date of Patent: Apr. 23, 1996

[54] DUAL CHAMBER TUNNEL FREEZER

[75] Inventors: Edward F. Kiczek, Long Valley, N.J.; Russell I. Snyder, III; Robert J. Shaw, both of Allentown, Pa.

[73] Assignee: Air Products and Chemicals, Inc., Allentown, Pa.

[21] Appl. No.: 426,538

[22] Filed: Apr. 20, 1995

[51] Int. Cl.$^6$ .................................................. F25D 17/02
[52] U.S. Cl. ................................................ 62/374; 62/380
[58] Field of Search ............................ 62/374, 380, 381, 62/63, 65

[56] References Cited

U.S. PATENT DOCUMENTS

| | | | |
|---|---|---|---|
| 4,539,824 | 9/1985 | Kuraoka et al. | 62/380 |
| 4,800,728 | 1/1989 | Klee | 62/63 |
| 4,914,927 | 4/1990 | Miller et al. | 62/381 |

*Primary Examiner*—Ronald C. Capossela
*Attorney, Agent, or Firm*—Robert J. Wolff

[57] ABSTRACT

The present invention is a tunnel freezer which employs two distinct chambers for crust freezing the bottom surfaces of items to be processed without substantially refrigerating the remainder of the items. In this manner, the product is made ready for transfer to downstream operations without worry of sticking to belt surfaces. The present invention has application in setting the bottom surface of food items such as cookies, bakery items, caramel coated candies, taffy and the like.

7 Claims, 1 Drawing Sheet

DUAL CHAMBER TUNNEL FREEZER

FIELD OF THE INVENTION

The present invention relates to a tunnel-type freezer wherein the items to be frozen move through an elongated tunnel and wherein the freezer employ two distinct chambers for crust freezing the bottom surfaces of items to be processed without substantially refrigerating the remainder of the items.

BACKGROUND OF THE INVENTION

Tunnel freezers are well known in the art. The conventional tunnel freezer comprises:

(a) an elongated tunnel having a first end and a second end;

(b) an item entrance port located at or near the first end for introducing items to be frozen into the tunnel;

(c) an item exit port located at or near the second end for withdrawing the frozen items from the tunnel;

(d) a conveyor belt for moving the items from the item entrance port, through the tunnel, and to the item exit port;

(e) a refrigerant admission port for introducing a refrigerant into the tunnel; and (f) a refrigerant discharge port for withdrawing the refrigerant from the tunnel.

See for example U.S. Pat. No. 4,800,728 by Klee.

There is a need in the food freezing industry to crust freeze the bottom surfaces of items to be processed without substantially refrigerating the remainder of the items. In this manner, the item is made ready to transfer for downstream operations without worry of sticking to belt surfaces. An example of such an operation is caramel coated cookies or peanut brittle candies where subsequent transfer to other operations needs to be accomplished. Without setting the bottom surface via cryogenic freezing, the item can be torn or ripped in transfer.

The drum freezer taught in U.S. Pat. No. 4,914,927 by Miller et al. can crust freeze bottom surfaces without substantially refrigerating the remainder of the item but unfortunately adds an undesirable curvature to the item due to the item being placed on the circumference. The present invention overcomes this deficiency in the prior art drum freezer.

SUMMARY OF THE INVENTION

The present invention is a tunnel freezer which employs two distinct chambers for crust freezing the bottom surfaces of items to be processed without substantially refrigerating the remainder of the items. In this manner, the product is made ready for transfer to downstream operations without worry of sticking to belt surfaces. The present invention has application in setting the bottom surface of food items such as cookies, bakery items, caramel coated candies, taffy and the like.

DETAILED DESCRIPTION OF THE INVENTION

Figure 1:
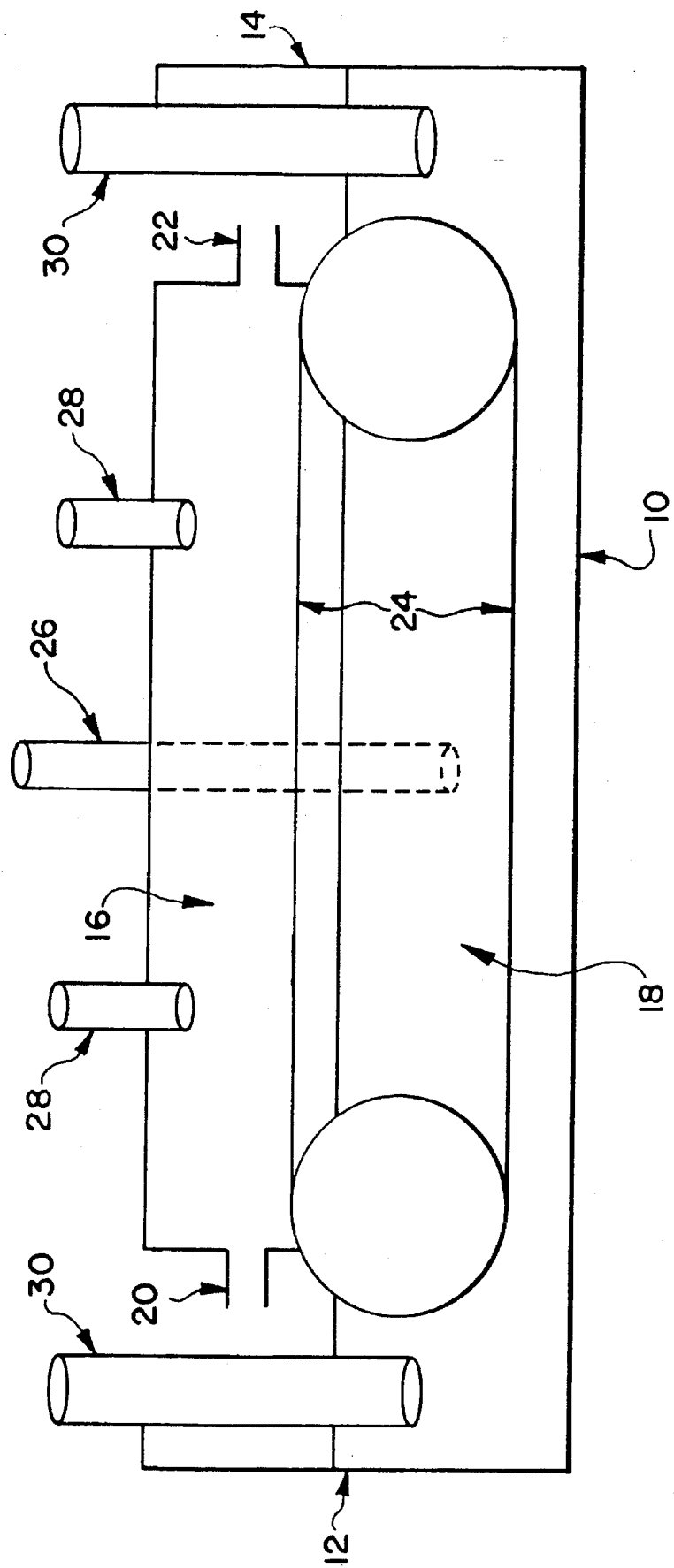
FIG. 1 is a schematic diagram of one embodiment of the present invention.

The tunnel freezer of the present invention is best illustrated with reference to a specific embodiment thereof such as FIG. 1's embodiment. FIG. 1's tunnel freezer comprises:

(a) an elongated tunnel 10 having a first end 12 and a second end 14 and a top chamber 16 and a bottom chamber 18;

(b) an item entrance port 20 located in the top chamber at or near the first end for introducing the items to be processed into the tunnel and for introducing ambient air into the top chamber;

(c) an item exit port 22 located in the top chamber at or near the second end for withdrawing the processed items from the tunnel and for introducing additional ambient air into the top chamber;

(d) a solid conveyor belt 24 for moving the items from the item entrance port, through the top chamber and to the item exit port wherein said moving occurs at an angle substantially parallel to the longitudinal axis of the tunnel;

(e) a belt return section located in the bottom chamber for returning the conveyor belt back to the item entrance port;

(f) a refrigerant admission 26 port for introducing a refrigerant into the bottom chamber;

(g) one or more ambient air exhaust ports 28 for withdrawing the ambient air out of the top chamber; and (h) one or more refrigerant exhaust ports 30 for withdrawing the refrigerant out of the bottom chamber.

The present invention works by exposing the bottom surface of a warm and/or tacky food item to a chilled solid belt. The belt is chilled in the bottom chamber to a temperature generally less than −73° C. via exposure to the refrigerant which is introduced into the bottom chamber. Through conduction, the bottom surface of the item is chilled or frozen to remove the heat and/or tackiness. By freezing then subcooling, the bottom surface of the item contracts to prevent adhesion of the bottom surface to the belt.

The refrigerant can be introduced into the bottom chamber in either a gaseous state or a liquid state. In either case, the refrigerant is withdrawn in its gaseous state. With regard to introducing the refrigerant in its liquid state, this can be accomplished via cryogenic spray into fans or onto the belt underside with a catch basin and runners to effect one isothermal chamber. Alternatively, the belt can be immersed in a bath of the liquid refrigerant. A preferred refrigerant for the present invention is nitrogen.

The item is placed on the belt in the top chamber where it is subject to ambient air and thus significantly warmer temperatures. The remaining surfaces of the item therefore are subject to little or no cooling.

It should be noted that the ambient air exhaust port(s) can be eliminated by consolidating their function into the refrigerant exhaust port(s). In such a case, one or more openings are inserted between the top and bottom chambers. Gaseous exhaust is pulled from the refrigerant exhaust port(s) at a rate equal to or higher than the rate of refrigerant introduction to effect ambient air flow into the top chamber (through the item entrance and exit ports) and subsequently into the bottom chamber (through said openings) and finally out of the bottom chamber through the refrigerant exhaust port(s). The trade-off for this simplified design is a modest amount of heat leak between the top ambient chamber and the bottom cryogenic chamber.

It should further be noted that, if desired, some chilling can be accomplished in the top ambient chamber by slowing the rate at which the ambient air is withdrawn from the top chamber and thus increasing the average exposure time of the ambient air in the top chamber to the chilled belt. To obtain the maximum amount of chilling in the top chamber, the rate at which the ambient air is withdrawn from the top chamber via an exhaust port is set to zero. In this scenario, the flow of ambient air into and out of the top chamber (via the item entrance and exit ports) will be at a minimum and will result from natural convection as the air inside the top chamber cools from exposure to the chilled belt.

The present invention has been described with reference to a specific embodiment thereof. This embodiment should not be seen as a limitation of the scope of the present invention; the scope of such being ascertained by the following claims.

We claim:

1. A dual chamber tunnel freezer for crust freezing the bottom surfaces of items to be processed without substantially refrigerating the remainder of the items comprising:

(a) an elongated tunnel having a first end and a second end and a plate that divides said tunnel into a top chamber and a bottom chamber;

(b) an item entrance port located in the top chamber at or near the first end for introducing the items to be processed into the top chamber and for introducing ambient air into the top chamber;

(c) an item exit port located in the top chamber at or near the second end for withdrawing the processed items from the top chamber and for introducing additional ambient air into the top chamber;

(d) a solid conveyor belt for moving the items from the item entrance port, through the top chamber and to the item exit port wherein said moving occurs at an angle substantially parallel to the longitudinal axis of the tunnel;

(e) a belt return section located in the bottom chamber for returning the conveyor belt back to the item entrance port; and (f) a refrigerant admission port for introducing a refrigerant into the bottom chamber.

2. The tunnel freezer of claim 1 which further comprises:

(g) at least one ambient air exhaust port for withdrawing the ambient air out of the top chamber; and (h) at least one refrigerant exhaust port for withdrawing the refrigerant out of the bottom chamber.

3. The tunnel freezer of claim 2 wherein the refrigerant admission port introduces a gaseous refrigerant into the bottom chamber.

4. The tunnel freezer of claim 3 wherein the gaseous refrigerant is gaseous nitrogen.

5. The tunnel freezer of claim 2 wherein the refrigerant admission port introduces a liquid refrigerant into the bottom chamber.

6. The tunnel freezer of claim 5 wherein the liquid refrigerant is liquid nitrogen.

7. The tunnel freezer of claim 1 which further comprises:

(g) at least one opening between the top and bottom chambers; and (h) at least one ambient air/refrigerant exhaust port for (i) withdrawing the refrigerant out of the bottom chamber and (ii) for withdrawing the ambient air out of the top chamber through said one or more openings and subsequently out of the bottom chamber.

* * * * *